Dec. 27, 1966   F. C. ANDERSON   3,294,444
SEAT BELT FOR VEHICLES
Filed June 18, 1964   2 Sheets-Sheet 1
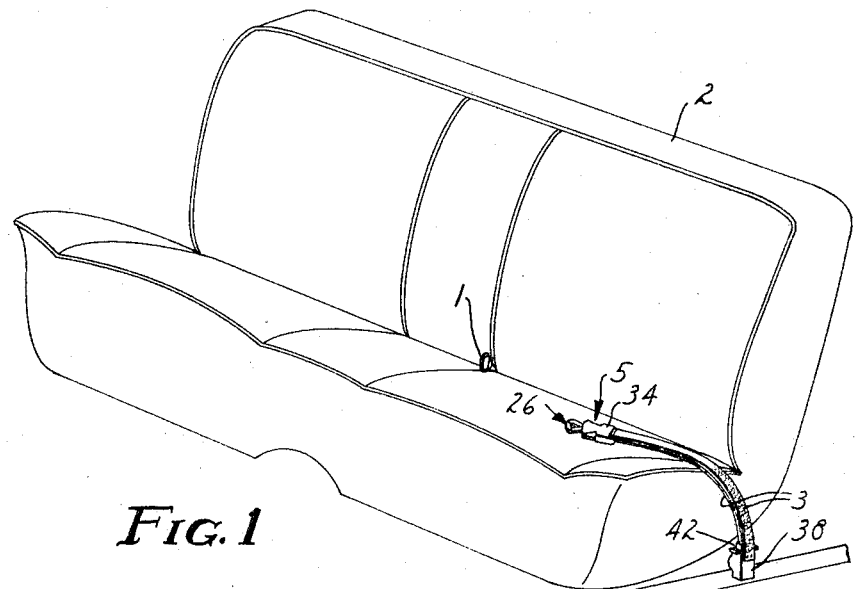
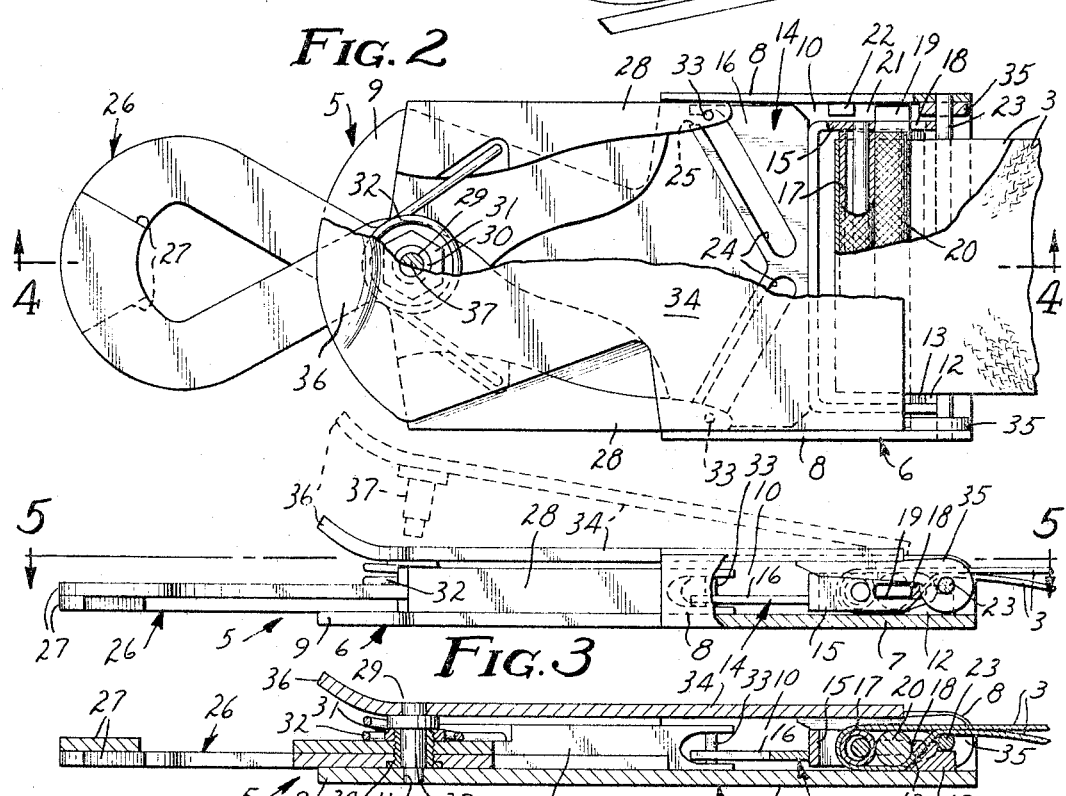
INVENTOR.
FRANKLIN C. ANDERSON
BY
Merchant, Merchant + Gould
ATTORNEYS Dec. 27, 1966 F. C. ANDERSON 3,294,444
SEAT BELT FOR VEHICLES
Filed June 18, 1964 2 Sheets-Sheet 2

INVENTOR.
FRANKLIN C. ANDERSON
BY
Merchant, Merchant + Gould
ATTORNEYS

United States Patent Office 3,294,444
Patented Dec. 27, 1966

3,294,444
SEAT BELT FOR VEHICLES
Franklin C. Anderson, 557 Ridge Road,
Owatonna, Minn. 55060
Filed June 18, 1964, Ser. No. 376,191
6 Claims. (Cl. 297—385)

This invention relates generally to body restraining devices for seats, and more particularly, it relates to a passenger safety belt for vehicle seats.

An important object of the present invention is the provision of a passenger seat belt for vehicles which includes a belt adapted for placement across the lap of the passenger, and which also includes a novel releasable latch member which may be quickly and conveniently engaged and disengaged with one hand.

Another object of the present invention is the provision of a passenger seat belt for vehicles which includes a ring element adapted for securement to the vehicle adjacent one side of a passenger's position, an elongated belt adapted for securement to the vehicle adjacent the other side of the passenger's position, and a releasable latch member carried by the elongated belt and connectable to the ring element.

Another object of the present invention is the provision of a latch member for a passenger seat belt for vehicles which may be very quickly released or disengaged in an emergency.

Another object of this invention is the provision of a seat belt construction in which the belt and latch mechanism are adapted to be returned to a reel housing or holster at the side of the seat each time the belt is unlatched, and wherein the belt length is adjusted to the wearer's girth with each engagement and whereby the latch mechanism is adapted for engagement in the proper manner to insure ready access to the emergency release mechanism.

Another object of the present invention is the provision of a passenger seat belt for vehicles in which the belt is retractable upon a spring loaded reel adapted for securement to the vehicle.

Another object of this invention is the provision of a passenger seat belt for vehicles which includes a novel releasable latch member which comprises a pair of jaw elements having outer jaw end portions adapted for releasable connection to the ring element and also having inner lever end portions with the jaw elements connected together for opening movements of the outer jaw end portions upon the squeezing together of the inner lever end portions.

A still further object of the present invention resides in the provision of a releasable latch member for a passenger seat belt which includes a novel cam-actuated roller combination carrying the seat belt and actuated upon the squeezing together of the inner lever end portions of the jaw elements for permitting the adjustment of the belt with respect to the lach member.

The above and sill further objects and advantages of this invention will become apparent from a consideration of the following detailed specification, appended claims and drawings.

Referring to the drawings, wherein like reference characters indicate like parts or elements throughout the several views:

FIG. 1 is a view in perspective showing a safety belt constructed in accordance with the present invention and installed with respect to the passenger's position;

FIG. 2 is an enlarged view in top plan of the latch member provided in accordance with the present invention, some parts being broken away and some parts shown in section;

FIG. 3 is a view in side elevation of the latch member, with an alternative position of some parts shown by dotted lines, some parts being broken away and some parts shown in section;

FIG. 4 is a view in longitudinal section taken upon the line 4—4 of FIG. 2;

Figure 5:
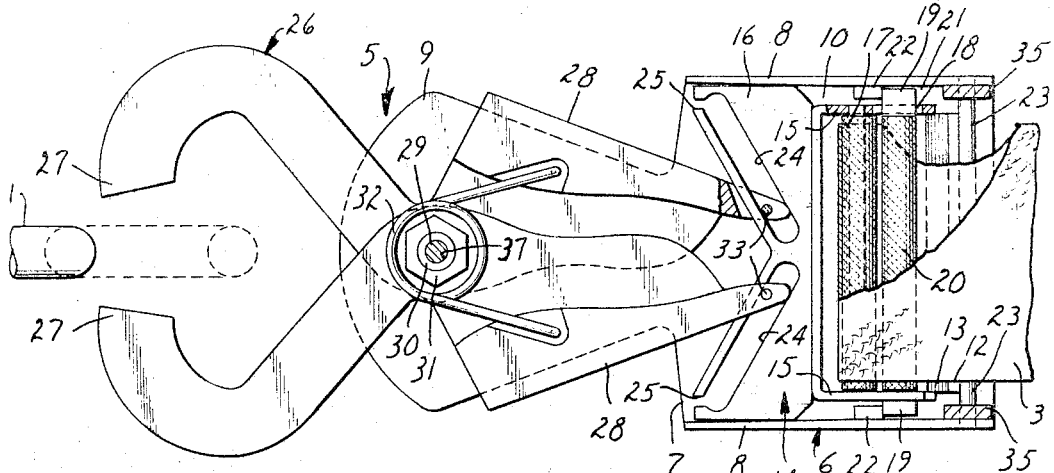
FIG. 5 is a view in section taken approximately on the line 5—5 of FIG. 3, with the jaw elements being shown in their alternative open position and with an alternative position of some other parts being shown by dotted lines, and with still other parts being broken away.

Referring to the drawings, and particularly FIG. 1 thereof, the seat belt construction of the present invention includes a ring element 1 adapted for securement to the vehicle adjacent one side of a passenger position. As illustrated, the ring element 1 is disposed adjacent the rear of the vehicle seat 2 and is suitably rigidly secured to the vehicle, such as by an extension to the floor or frame, not shown. The seat belt construction further comprises an elongated belt 3 adapted for securement to the vehicle adjacent the other side of the passenger position, as illustrated particularly in FIG. 1, the belt 3 being wound on a retaining reel, represented generally by the reference numeral 4 and described particularly hereinafter. The elongated belt 3 is connectable to the ring element 1 by means of a novel releasable latch member, represented generally by the reference numeral 5.

The latch member 5 is illustrated particularly in FIGS. 2–5 and comprises a casing member 6 having a bottom wall 7, spaced side walls 8, and a forwardly projecting tongue plate 9. The casing member 6 defines intermediate the side walls 8 a chamber 10. The projecting tongue plate 9 of the casing member 6 defines a bearing recess 11, the purpose of which will be noted hereinafter. Adjacent the rear of the chamber 10 of the casing member 6 is positioned an elongated transversely extending abutment bar 12 having striations 13 across the front face thereof.

In order to connect the elongated belt 3 to the latch member 5, a novel yoke and roller arrangement, sometimes referred to herein as roller means, is disposed within the chamber 10 of the casing member 6. The yoke member 14 comprises a pair of rearwardly projecting side bars 15 and a forwardly projecting cam plate 16. The yoke member 14 is slidably received between the side walls 8 of the casing member 6 and located generally forwardly of the abutment bar 12. As shown particularly in FIGS. 2–5, a roller 17 is generally freely rotatably mounted between the side bars 15 of the yoke member 14 and disposed in spaced generally parallel relation to the abutment bar 12. It will be noted that the side bars 15 define elongated transversely aligned slots 18 adapted to receive the projecting flat end portions 19 of an elongated roll member 20 disposed rearwardly of the roller 17. It is noted that the roll member 20, like the roller 17, is knurled so as to increase the frictional engagement with the elongated belt 3. With this arrangement, it will be noted that the roll member 20 is mounted for laterally sliding movements between the roller 17 and the abutment bar 12, or, more particularly, for laterally sliding movements toward and away from the abutment bar 12. As shown particularly in FIG. 2, when the yoke member 14 is received within the chamber 10 of the casing member 6, the opposed flat end portions 19 of the roll member 20 are disposed within opposed recesses 21 defined rearwardly of a pair of opposed stop bars 22. In accordance with this invention, the elongated belt 3 passes between the abutment bar 12 and the roll member 20 and under the roller 17 and back over the roller 17 and the roll member 20. The doubled layers of the belt 3 then pass over a cross shaft 23.

The cam plate 16 defines a pair of outwardly and forwardly diverging cam slots 24 which are open, as at 25, at the spaced front end portions of the cam plate 16. The cam plate 16 when actuated by follower elements to be described hereinafter moves the roller 17 and the roll member 20 back and forth to permit either adjustment of the elongated belt 3 or to bind and hold the same against the abutment bar 12.

The latch member 5 of the present invention further comprises a pair of jaw elements, each represented generally by the reference numeral 26. The jaw elements 26 define outer jaw end portions 27 which are hook-shaped and adapted for releasable connection to the ring element 1. The jaw elements 26 also define inner lever end portions 28 which are normally positioned within the chamber 10 of the casing member 6. The jaw elements 26 are pivotally connected together at intermediate portions 29 thereof by means of a tubular bolt 30 and nut 31. The jaw elements 26 are thereby connected together for opening and closing movements of the outer jaw end portions 27, with the closed position being shown in FIG. 2 and the open position being shown in FIG. 5. A coil spring 32 is concentrically positioned with respect to the axis of connection of the jaw elements 26, with the spring end portions secured in corresponding recesses defined in the jaw elements 26 whereby to bias the outer jaw end portions 27 toward a normally closed position shown in FIG. 2. As shown in the drawings, the opposite sides of the projecting tongue plate 9 of the casing member 6 are cut away so as to permit the convenient squeezing together of the inner lever end portions 28 of the jaw elements 26 to the position shown in FIG. 5 for opening the outer jaw end portions 27. The outer jaw end portions 27 and the intermediate portions 29 of the jaw elements 26 are of a reduced thickness to overlie one another, as shown particularly in FIGS. 3 and 4, whereas the outer sides of the inner lever end portions 28 of the jaw elements 26 are built up to a greater thickness slightly less than the height of the side walls 8 of the casing member 6, as shown particularly in FIGS. 3 and 4.

As shown in the drawings, the rear end portions of the jaw elements 26 are bifurcated and are provided with cross pins 33 which act as follower elements and are normally received within the cam slots 24 of the cam plate 16. The rearward position of the cam plate 16 corresponding to the closed position of the jaw elements 26 is illustrated particularly in FIGS. 2–4 of the drawings. In this position, the follower elements or cross pins 33 have biased the cam plate 16 in a rearward direction so that the forward end portions of the opposed slots 18 in the side bars 15 engage the flat end portions 19 of the roll member 20 so as to bias the same rearwardly and bind the belt 3 between the knurled surface of the roller member 20 and the abutment bar 12. Upon squeezing together the inner lever end portions 28 of the jaw elements 26 toward the position shown in FIG. 5, the cross pins 33 ride against the diverging cam slots 24 so as to move the cam plate 16 forwardly and thereby pull the yoke member 14 and the roller 17 away from the roll member 20, as shown particularly in FIG. 5. Forward movement of the roll member 20 is halted by the stop bars 22 which engage the flat end portions 19 of the roll member 20. In the position shown in FIG. 5, the belt 3 is free to pass by the roll member 20 which has been spaced from the abutment bar 12 in order to permit adjustment of the effective length of the belt 3. With this arrangement, it will be appreciated that the yoke member 14, roller 17, and roll member 20 are moved forwardly to permit adjustment of the belt 3 in response to opening movements of the jaw elements 26, whereas when the jaw elements 26 are normally biased to their closed position, the yoke member 14 is moved rearwardly so as to bind or hold the belt 3 to the desired adjusted position.

In accordance with the present invention, means is also provided for releasably mounting the jaw elements 26 onto the projecting tongue plate 9 of the casing member 6 so as to provide an emergency release mechanism whereby the jaw elements 26 may be quickly released from the casing member 6. This releasable mounting means comprises an elongated lever plate 34 mounted for pivotal movements on the cross shaft 23 of the casing member 6 by means of a pair of spaced depending bearing ears 35. It will be noted that the lever plate 34 also has the side portions thereof cut away in correspondence with the tongue plate 9 of the casing member 6 so as to permit inward squeezing movements of the inner lever end portions 28 of the jaw elements 26. The forward end portion of the lever plate 34 is outwardly flanged so as to define a quickly engageable tab 36, and the lever plate 34 also defines an elongated inwardly projecting mounting pin 37. The mounting pin 37 is of a diameter to be snugly receivable in the axial bore or aperture of the tubular bolt 30, with the end portion of the mounting pin 37 also being received in the recess 11 of the tongue plate 9, as shown particularly in FIG. 4 of the drawings. Of course, the mounting pin 37 forms a spindle for the pivotal interaction between the jaw elements 26.

With the above-noted arrangement, the lever plate 34 is mounted for movements between a locked position shown by full lines in FIGS. 2–4, wherein the mounting pin 37 is received in the axial bore or aperture of the tubular bolt 30 and is also engaged within the recess 11 of the tongue plate 9, and a released position shown by dotted lines in FIG. 3, wherein the pin 37 is removed, so as to permit the quick removal of the jaw elements 26 from the casing member 6, the cross pins 33 withdrawing from the open ends 25 of the slots 24 for quick release or disengagement of the belt 3 from the ring element 1.

Figures 6, 7:
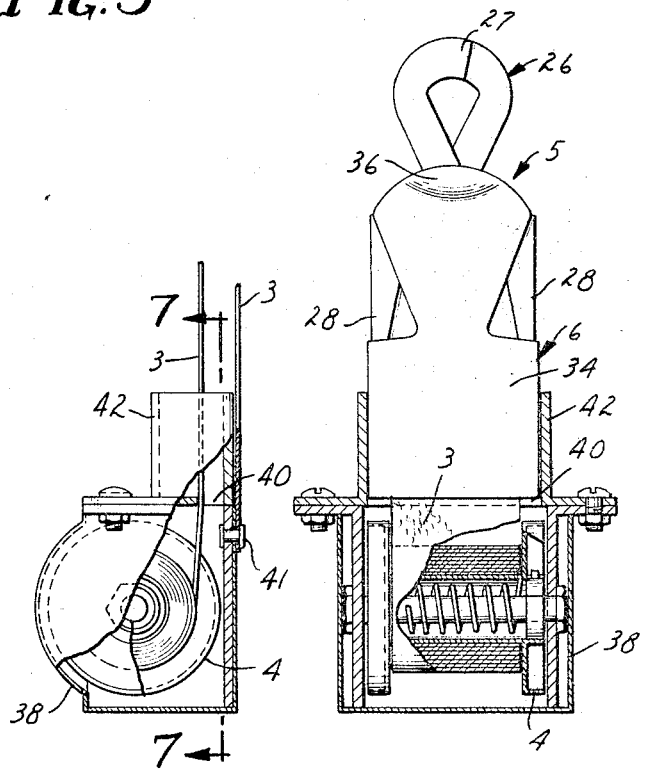
FIG. 6 is a view in side elevation of the real mechanism for winding the belt, some parts being broken away and some parts shown in section.
FIG. 7 is a view in vertical section taken on the line 7—7 of FIG. 6, some parts being broken away.

As noted previously, a spring loaded retaining reel 4 is provided for securing the end portions of the elongated belt 3 to the vehicle. More particularly, the same comprises a reel housing 38 in which is mounted the spring loaded retaining reel 4. One end portion of the elongated belt 3 is wound upon the retaining reel 4 and is passed upwardly through a slot or opening 40 in the top wall of the reel housing 38. The intermediate portion of the belt 3 is entrained around the roller 17 of the latch member 5, as noted previously, and returned to the reel 4. As shown particularly in FIG. 6, the other end portion of the elongated belt 3 is secured by fasteners 41 to the side wall of the reel housing 38. The upper portion of the reel housing 38 is formed to define a generally rectangular receptacle 42 adapted to receive the butt or lower end portion of the latch member 5 for conveniently storing the same, as illustrated in FIG. 7. In this stored or inoperative position illustrated in FIG. 7, the belt 3 is, of course, retractably wound upon the spring loaded retaining reel 4. When it is desired to use the novel seat belt construction of the present invention, the latch member 5 is grasped and the inner lever end portions 28 of the jaw elements 26 are squeezed together so as to permit the extension and adjustment of the elongated belt 3, prior to latching the jaw elements 26 to the ring element 1.

The operation of this invention is noted in connection with the above description. However, it may be further stated that when it is desired to engage the seat belt 3, the lever end portions 28 of the latch member 5 are squeezed together to permit adjutsment of the belt 3 to the correct length and also to permit the jaw end portions 27 to snap around the ring element 1. Then, should it be desired to quickly release the latch mechanism 5 (such as in an emergency), the lever plate 34 is merely moved outwardly to release the jaw elements 26, as noted previously. Since the belt 3 and latch mechanism 5 are properly returned after each disengagement to the reel housing or holster 38, the belt is adjusted to the wearer's girth with each extension and engagement with the ring 1.

Also, since the latch mechanism 5 and belt 3 are returned each time to the reel housing or holster 38, instead of lying in an obtrusive tangled manner on the seat as is often true with conventional devices, it is most probable that the latch mechanism 5 will *not* be engaged in a reversed or upside down position so as to hide and render ineffective or unavailable the emergency release lever plate 34.

This invention has been thoroughly tested and found to be completely satisfactory for the accomplishment of the above-noted objects; and while a preferred embodiment thereof in which the principles of the present invention have been incorporated has been shown and described above, it should be specifically understood that the same may be modified without departure from the scope and spirit of the appended claims.

What is claimed is:

1. A passenger safety belt for vehicles comprising:
   (a) a ring element for securement to the vehicle adjacent one side of a passenger position,
   (b) an elongated belt for securement to the vehicle adjacent the other side of a passenger position, and
   (c) a releasable latch member carried by said elongated belt and connectable to said ring element, said latch member comprising:
      (1) a casing member,
      (2) a pair of jaw elements having outer jaw end portions for releasable connection to said ring element and also having inner lever end portions,
      (3) means pivotally connecting said jaw elements together for opening movements of the outer jaw end portions upon the squeezing together of said inner lever end portions,
      (4) means biasing said outer jaw end portions toward a normally closed position, and
      (5) means releasably mounting said jaw elements on said casing member.

2. A passenger safety belt for vehicles comprising:
   (*a*) a ring element for securement to the vehicle adjacent one side of a passenger position,
   (*b*) an elongated belt for securement to the vehicle adjacent the other side of a passenger position, and
   (*c*) a releasable latch member carried by said elongated belt and connectable to said ring element, said latch member comprising:
      (1) a casing member,
      (2) roller means disposed within said casing member and having said belt entrained thereon,
      (3) a pair of jaw elements having outer jaw end portions for releasable connection to said ring element and also having inner lever end portions,
      (4) means releasably mounting said jaw elements on said casing member for opening and closing movements of the outer end portions of said jaw elements,
      (5) a cam member connected to said roller means and disposed adjacent the inner end portions of said jaw elements, said cam member being mounted for movements between a first position wherein said belt may be adjusted with respect to said roller means and a second position wherein said roller means restrains movement of said belt, and
      (6) the inner end portions of said jaw elements being connected with said cam member and moving the same to its said first position in response to said opening movements of said jaw elements and also moving said cam member to its second position in response to said closing movements of said jaw elements.

3. A passenger safety belt for vehicles comprising:
   (*a*) a ring element for securement to the vehicle adjacent one side of a passenger position,
   (*b*) an elongated belt for securement to the vehicle adjacent the other side of the passenger position, and
   (*c*) a releasable latch member carried by said elongated belt and connectable to said ring element, said latch member comprising:
      (1) a casing member having a bearing recess,
      (2) a pair of jaw elements having outer jaw end portions for releasable connection to said ring element and also having inner lever end portions, said jaw elements also defining a transversely extending bearing aperture alignable with the bearing recess of said casing member,
      (3) means pivotally connecting said jaw elements together for opening movements of the outer jaw end portions upon the squeezing together of said inner lever end portions,
      (4) means biasing said outer jaw end portions toward a normally closed position, and
      (5) means releasably mounting said jaw elements on said casing member, said means comprising:
         (*a*) a lever plate,
         (*b*) said lever plate having an elongated mounting pin projecting therefrom, and
         (*c*) means mounting said lever plate on said casing member for movements between a locked position wherein said pin is received within said bearing aperture of said jaw elements and also engaged in said recess of the casing member and a released position permitting removal of said jaw elements from said casing member.

4. A passenger safety belt for vehicles comprising:
   (a) a ring element for securement to the vehicle adjacent one side of a passenger position,
   (b) an elongated belt for securement to the vehicle adjacent the other side of a passenger position, and
   (c) a releasable latch member carried by said elongated belt and connectable to said ring element, said latch member comprising:
      (1) a casing member defining an elongated abutment element,
      (2) roller means disposed within said casing member, said roller means comprising:
         (a) a yoke slidably received within said casing member,
         (b) a roller mounted on said yoke for rotary movements and disposed in spaced generally parallel relation to said abutment element,
         (c) an elongated roll member interposed between said abutment element and said roller and mounted for laterally sliding movements toward and away from said abutment element, and
         (d) said elongated belt passing between said abutment element and said roll member,
      (3) a pair of jaw elements having outer jaw end portions for releasable connection to said ring element and also having inner lever end portions,
      (4) means releasably mounting said jaw elements on said casing member for opening and closing movements of the outer end portions of said jaw elements,
      (5) a cam member connected to the yoke of said roller means and disposed adjacent the inner end portions of said jaw elements, said cam member and said yoke being mounted for movements between a first position wherein said roller is relatively widely spaced from said abutment element whereby said belt is free to pass between said roll member and said abutment element and a second position wherein said roller is biased against said roll member whereby to bind said belt between said roll member and said abutment element, and (6) the inner end portions of said jaw elements being connected with said cam member and said yoke and moving the same to their said first position in response to opening movements of said jaw elements and also moving said cam member and said yoke to their said second position in response to said closing movements of said jaw elements.

5. The structure defined in claim 1 wherein said means releasably mounting said jaw elements comprises a release lever pivotally connected to said casing member and releasably pinning said jaw elements to said casing member.

6. A passenger safety belt for vehicles comprising:
  (a) a ring element for securement to the vehicle adjacent one side of a passenger position,
  (b) an elongated belt for securement to the vehicle adjacent the other side of a passenger position, and
  (c) a releasable latch member carried by said elongated belt and connectable to said ring element, said latch member comprising:
    (1) a casing member,
    (2) roller means disposed within said casing member and having said belt entrained thereon,
    (3) a pair of jaw elements having outer jaw end portions for releasable connection to said ring element and also having inner lever end portions,
    (4) means releasably mounting said jaw elements on said casing member for opening and closing movements of the outer end portions of said jaw elements,
    (5) a cam member connected to said roller means and disposed adjacent the inner end portions of said jaw elements, said cam member being mounted for movements between a first position wherein said belt may be adjusted with respect to said roller means and a second position wherein said roller means restrains movement of said belt, said cam member further defining cam slots, and
    (6) the inner end portions of said jaw elements defining follower elements received in the cam slots of said cam member for moving the same to its said first position in response to opening movements of said jaw elements and also moving said cam member to its second position in response to closing movements of said jaw elements.

References Cited by the Examiner
UNITED STATES PATENTS

| | | | |
|---|---|---|---|
| 2,927,358 | 3/1960 | Ratcliff | 24—241 |
| 2,972,173 | 2/1961 | Weber | 24—171 |
| 3,100,669 | 8/1963 | Monroe | 297—388 |
| 3,126,227 | 3/1964 | Bollinger | 297—385 |
| 3,171,688 | 3/1965 | Nicholas | 297—388 |
| 3,194,602 | 7/1965 | Gottwald | 297—385 |

FRANK B. SHERRY, *Primary Examiner.*

J. S. PETRIE, R. B. FARLEY, *Assistant Examiners.*